United States Patent
Pi et al.

(10) Patent No.: US 12,080,016 B2
(45) Date of Patent: Sep. 3, 2024

(54) METHOD AND APPARATUS WITH POSE PREDICTION

(71) Applicant: SAMSUNG ELECTRONICS CO., LTD., Suwon-si (KR)

(72) Inventors: Jaehwan Pi, Suwon-si (KR); Yun-Tae Kim, Suwon-si (KR); Donghoon Sagong, Suwon-si (KR); Hojin Ju, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 609 days.

(21) Appl. No.: 17/344,667

(22) Filed: Jun. 10, 2021

(65) Prior Publication Data
US 2022/0237814 A1 Jul. 28, 2022

(30) Foreign Application Priority Data
Jan. 25, 2021 (KR) .................. 10-2021-0010136

(51) Int. Cl.
*G06N 3/08* (2023.01)
*G06N 3/044* (2023.01)
*G06T 7/70* (2017.01)
*G06V 10/75* (2022.01)

(52) U.S. Cl.
CPC .............. *G06T 7/70* (2017.01); *G06N 3/044* (2023.01); *G06N 3/08* (2013.01); *G06V 10/751* (2022.01); *G06T 2207/20081* (2013.01); *G06T 2207/20084* (2013.01)

(58) Field of Classification Search
CPC ............ G06T 7/70; G06T 2207/20081; G06T 2207/20084; G06T 7/277; G06T 7/246; G06T 7/20; G06T 19/006; G06N 3/044; G06N 3/08; G06N 3/084; G06V 10/751; G06V 10/82; G06V 20/20
USPC ........................................ 382/100
See application file for complete search history.

(56) References Cited

U.S. PATENT DOCUMENTS

| | | |
|---|---|---|
| 7,412,077 B2 | 8/2008 | Li et al. |
| 9,063,330 B2 | 6/2015 | LaValle et al. |
| 10,216,265 B1 | 2/2019 | Kirchner et al. |
| 10,529,250 B2 | 1/2020 | Lehari |
| 10,775,881 B1 | 9/2020 | Lahr et al. |
| 2003/0023192 A1 | 1/2003 | Foxlin |
| 2014/0148707 A1 | 5/2014 | Encaoua et al. |

(Continued)

FOREIGN PATENT DOCUMENTS

| | | |
|---|---|---|
| KR | 10-2018-0011984 A | 2/2018 |
| WO | WO 2017/127366 A1 | 7/2017 |

OTHER PUBLICATIONS

Xu, Mai, et al. "Predicting Head Movement in Panoramic Video: A Deep Reinforcement Learning Approach." *IEEE Transactions on Pattern Analysis and Machine Intelligence* 41.11 (2018): 2693-2708 (15 pages in English).

*Primary Examiner* — Charlotte M Baker
(74) *Attorney, Agent, or Firm* — NSIP Law

(57) ABSTRACT

A processor-implemented pose prediction method includes: estimating a pose of a user for a predetermined period of time in real time; calculating an estimation confidence of the estimated pose; determining a weight for the pose of the user based on the estimated pose and the estimation confidence; and predicting a pose of the user after the predetermined period of time, based on the weight.

25 Claims, 9 Drawing Sheets

(56) References Cited

U.S. PATENT DOCUMENTS

| | | | |
|---|---|---|---|
| 2016/0004303 A1* | 1/2016 | Arar | G06F 3/013 |
| | | | 345/156 |
| 2018/0180682 A1* | 6/2018 | Miller | G01R 33/0029 |
| 2019/0057265 A1 | 2/2019 | Schwarz et al. | |
| 2019/0128673 A1 | 5/2019 | Faragher et al. | |
| 2019/0196190 A1 | 6/2019 | Rouzes | |
| 2020/0019231 A1 | 1/2020 | Chung et al. | |

\* cited by examiner

METHOD AND APPARATUS WITH POSE PREDICTION

CROSS-REFERENCE TO RELATED APPLICATIONS

This application claims the benefit under 35 U.S.C. § 119(a) of Korean Patent Application No. 10-2021-0010136 filed on Jan. 25, 2021, in the Korean Intellectual Property Office, the entire disclosure of which is incorporated herein by reference for all purposes.

BACKGROUND

1. Field

The following description relates to a method and apparatus with pose prediction.

2. Description of Related Art

In various augmented reality (AR) devices, latencies may occur due to, for example, physical limitations caused by sensing, rendering, and display processes. Due to a motion-to-photon latency occurring in such an AR environment, a dynamic matching error between a virtual object and a real object according to an actual movement of a user may occur. For example, when a simultaneous localization and mapping (SLAM) scheme is used to estimate a pose of a user, an estimation error compared to ground-truth information may be included in an input value. Also, since a head motion of a user is nonlinear, the time required to estimate a motion may increase. In addition, in the case of a large movement of a user, overshooting may occur, which may cause a great matching error during matching between a virtual object and a real object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented pose prediction method includes: estimating a pose of a user for a predetermined period of time in real time; calculating an estimation confidence of the estimated pose; determining a weight for the pose of the user based on the estimated pose and the estimation confidence; and predicting a pose of the user after the predetermined period of time, based on the weight.

The method may include: calculating a prediction error between the estimated pose and the predicted pose, based on the estimation confidence; and tuning an artificial neural network (ANN) model by feeding back the prediction error, the ANN model being configured to predict a pose of the user.

The calculating of the prediction error may include calculating the prediction error based on a comparison result between the estimation confidence and a predetermined threshold.

The calculating of the prediction error based on the comparison result may include: calculating the prediction error in response to the estimation confidence being greater than the threshold; and adjusting the prediction error based on a comparison result between the estimated pose and a pose that is estimated for a time adjacent to the predetermined period of time for which the pose is estimated, in response to the estimation confidence being less than or equal to the threshold.

The tuning of the ANN model may include tuning a parameter of the ANN model by numerically calculating a gradient of the prediction error.

The tuning of the ANN model may include tuning a parameter of the ANN model using a least square scheme by grouping poses with relatively high estimation confidences as a reference set.

The calculating of the estimation confidence may include calculating an uncertainty of the estimated pose, based on an estimation covariance according to a simultaneous localization and mapping (SLAM) scheme with a Kalman filter.

The calculating of the estimation confidence may include calculating an uncertainty of the estimated pose, based on a residual value between the estimated pose and a value obtained by approximating the estimated pose using a curve fitting function.

The predicting of the pose may include: refining the estimated pose by adjusting the weight; and predicting the pose of the user after the predetermined period of time based on the refined pose, the estimation confidence, and the prediction error that is fed back.

The determining of the weight may include: setting the weight to be greater than a reference value in response to the estimation confidence being greater than a predetermined threshold; and adjusting the weight based on a pose that is estimated for a time adjacent to the predetermined period of time for which the pose is estimated, in response to the estimation confidence being less than or equal to the threshold.

The estimating of the pose may include estimating the pose of the user for the predetermined period of time corresponding to a sliding time window using a SLAM scheme in real time.

A non-transitory computer-readable storage medium may store instructions that, when executed by a processor, configure the processor to perform the method.

In another general aspect, a pose prediction apparatus includes: one or more sensors configured to sense a motion of a user for a predetermined period of time; and a processor configured to estimate a pose of the user based on the motion of the user in real time, calculate an estimation confidence of the estimated pose, determine a weight for the pose of the user based on the estimated pose and the estimation confidence, and predict a pose of the user after the predetermined period of time, based on the weight.

The processor may be configured to: calculate a prediction error between the estimated pose and the predicted pose, based on the estimation confidence; and tune an artificial neural network (ANN) model by feeding back the prediction error, the ANN model being configured to predict a pose of the user.

For the calculating of the prediction error, the processor may be configured to calculate the prediction error based on a comparison result between the estimation confidence and a predetermined threshold.

For the calculating of the prediction error, the processor may be configured to: calculate the prediction error in response to the estimation confidence being greater than the threshold; and adjust the prediction error based on a comparison result between the estimated pose and a pose that is estimated for a time adjacent to the predetermined period of time for which the pose is estimated, in response to the estimation confidence being less than or equal to the threshold.

For the tuning of the ANN model, the processor may be configured to tune a parameter of the ANN model by numerically calculating a gradient of the prediction error.

For the tuning of the ANN model, the processor may be configured to tune a parameter of the ANN model using a least square scheme by grouping poses with relatively high estimation confidences as a reference set.

For the predicting of the pose, the processor may be configured to: refine the estimated pose by adjusting the weight; and predict the pose of the user after the predetermined period of time based on the refined pose, the estimation confidence, and the prediction error that is fed back.

The apparatus may be an augmented reality (AR) glasses apparatus comprising a display configured to visualize a virtual content object and a real object that are matched based on the predicted pose of the user.

In another general aspect, an augmented reality (AR) glasses apparatus includes: one or more sensors configured to sense a motion of a user for a predetermined period of time; a processor configured to estimate a pose of the user based on the motion of the user in real time,
calculate an estimation confidence of the estimated pose, determine a weight for the pose of the user based on the estimated pose and the estimation confidence, predict a pose of the user after the predetermined period of time, based on the weight, and match a virtual content object and a real object based on the predicted pose of the user; and a display configured to visualize the virtual content object and the real object that are matched.

In another general aspect, a processor-implemented pose prediction method includes: determining a weight for a pose of a user based on an estimated pose of the user for a predetermined period of time and on an estimation confidence of the estimated pose; predicting, using a neural network model, a pose of the user after the predetermined period of time, based on the weight; calculating a prediction error of the predicted pose; and tuning the neural network model based on the prediction error.

In response to the estimation confidence being greater than a threshold, the calculating of the prediction error may include calculating the prediction error based on a comparison result between the estimated pose and the predicted pose.

In response to the estimation confidence being less than or equal to a threshold, the calculating of the prediction error may include calculating the prediction error based on a comparison result between the estimated pose and a pose that is estimated for a time adjacent to the predetermined period of time for which the pose is estimated.

The weight may be a weight of neural network model, and the predicting may include applying the weight to the estimated pose in response to inputting the estimated pose to the neural network model.

Other features and aspects will be apparent from the following detailed description, the drawings, and the claims.

Figure 1:
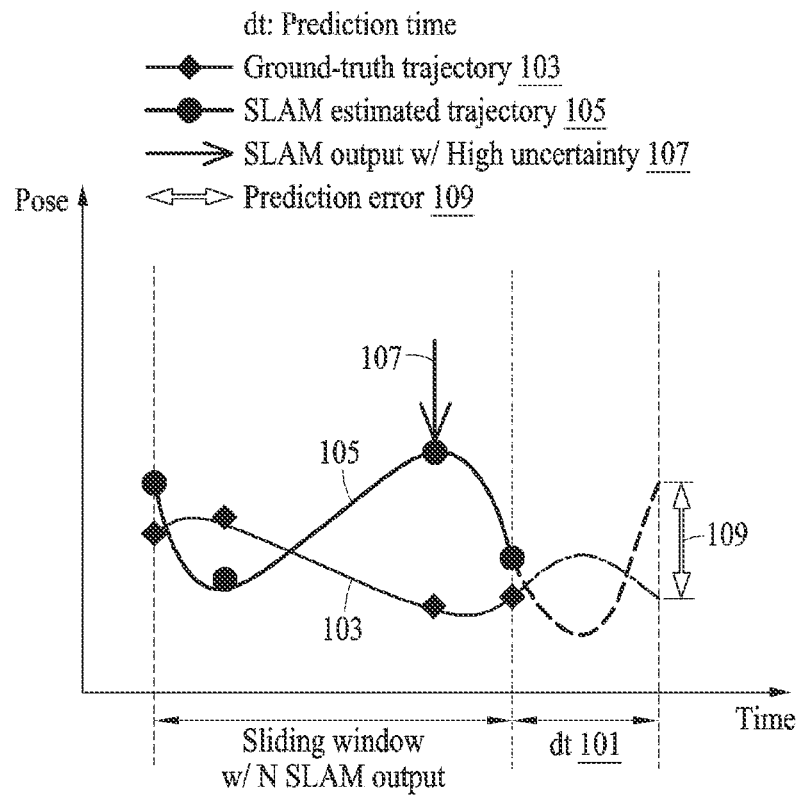
FIG. 1 illustrates an example of a simultaneous localization and mapping (SLAM) estimation error and a prediction error.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. Various modifications may be made to the examples. Here, the examples are not construed as limited to the disclosure and should be understood to include all changes, equivalents, and replacements within the idea and the technical scope of the disclosure.

The terminology used herein is for the purpose of describing examples only and is not to be limiting of the examples. As used herein, the singular forms "a", "an", and "the" are intended to include the plural forms as well, unless the context clearly indicates otherwise. As used herein, the term "and/or" includes any one and any combination of any two or more of the associated listed items. It will be further understood that the terms "include," "comprise," and "have", when used herein, specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein including technical or scientific terms have the same meaning as commonly understood by one of ordinary skill in the art to which this disclosure pertains after and understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

A component having a common function with a component included in one example is described using a like name in another example. Unless otherwise described, description made in one example may be applicable to another example and detailed description within a duplicate range is omitted.

FIG. 1 illustrates an example of a simultaneous localization and mapping (SLAM) estimation error and a prediction error. FIG. 1 illustrates a trajectory 105 (hereinafter, referred to as a "SLAM estimated trajectory 105") of "N" poses estimated by a SLAM scheme during a sliding window interval, and a prediction error 109 caused by a difference between a ground truth trajectory 103 and the SLAM estimated trajectory 105 in a prediction time dt 101 of the sliding window interval. The ground truth trajectory 103 may correspond to a measured trajectory.

A pose prediction apparatus (for example, an augmented reality (AR) apparatus) may predict a head motion of a user by modeling a nonlinear motion to reflect an actual motion of the user. For example, an AR apparatus may predict a motion through pose estimation according to a SLAM scheme which is to be used as an input for motion prediction. The SLAM scheme may correspond to a scheme of collecting data of a surrounding environment using various sensors (for example, a radar, a lidar, a global positioning system (GPS), and/or a camera) and of creating a map of a corresponding space based on the collected data while identifying a location of a device. For example, the SLAM estimated trajectory 105 may be used without a change to predict a pose of a user for the prediction time dt 101.

In this example, as shown in FIG. 1, the prediction error 109 may occur due to the difference between the ground truth trajectory 103 and the SLAM estimated trajectory 105. The prediction error 109 may further increase in response to a low confidence of an estimation result, for example, a point 107 with a high uncertainty in the SLAM estimated trajectory 105.

Thus, a pose prediction method and apparatus of one or more embodiments may use an estimated pose and an estimation confidence of the estimated pose together to minimize the prediction error 109 for a pose of a user, and accordingly the pose prediction method and apparatus of one or more embodiments may predict a pose robustly against an estimation error of the SLAM scheme.

Figure 2:
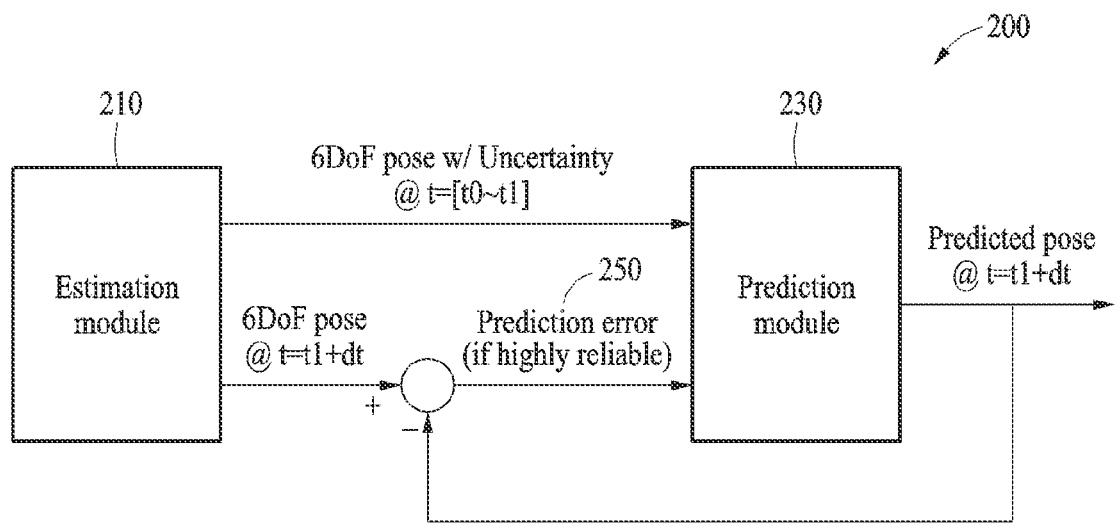
FIG. 2 illustrates an example of a concept of a pose prediction method.

FIG. 2 illustrates an example of a concept of a pose prediction method. FIG. 2 illustrates a configuration of a pose prediction apparatus 200. The pose prediction apparatus 200 may include an estimation module 210 and a prediction module 230.

The estimation module 210 may estimate a pose of a user in real time based on a SLAM scheme for a predetermined period of time (for example, time @t=t0~t1). The pose of the user estimated by the SLAM scheme may have six degrees of freedom (6DoF).

Also, the estimation module 210 may calculate an estimation confidence of the estimated pose. The estimation confidence may refer to a degree to which an estimated pose is reliable, or a confidence probability for an estimated pose. The estimation confidence may be expressed as, for example, a value greater than or equal to "0" and less than or equal to "1", however, there is no limitation thereto. The estimation confidence may be represented as, for example, an uncertainty value or a confidence probability.

The estimation module 210 may provide the estimated pose together with the estimation confidence (for example, an uncertainty value) of the estimated pose to the prediction module 230.

The prediction module 230 may include an artificial neural network (ANN) model that is configured to predict a pose of a user. The ANN model may correspond to an ANN that is pre-trained to predict a pose of a user based on an estimated pose and an estimation confidence. The ANN model may include, for example, a prediction model such as a prediction model 435 of FIG. 4, a non-limiting example of which will described later in greater detail. Training an ANN may include determining and updating weights, biases, and/or parameters between layers included in an ANN, and/or determining and updating weights, biases, and/or parameters between a plurality of nodes belonging to different layers among neighboring layers. The ANN model may be configured with or include, for example, a recurrent neural network (RNN), a long short-term memory (LSTM), and/or a regression model.

The prediction module 230 may determine a weight for a pose of a user based on the estimated pose and the estimation confidence that are received from the estimation module 210. The weight for the pose of the user may be a weight applied to a pose of a user input to the ANN model included in the prediction module 230. The pose of the user may include, for example, a head motion of the user, but is not limited thereto. In an example, to take into consideration nonlinearity of the head motion, the prediction module 230 may be configured using a deep learning structure (for example, the LSTM and/or the RNN).

The prediction module 230 may predict a pose (e.g., predicted pose) of the user after a predetermined period of time (for example, time @t=t1+dt) based on the weight (e.g., based on the weight for the pose of the user determined based on the estimated pose and the estimation confidence received from the estimation module 210). The pose of the user for the time @t=t1+dt predicted by the prediction module 230 may be fed back, and may be used to calculate a prediction error 250 between the pose estimated by the estimation module 210 for the time @t=t0~t1, and the pose for @t=t1+dt predicted by the prediction module 230.

The prediction module 230 of one or more embodiments may predict a pose of a user robustly against an estimation error of the SLAM scheme by tuning the ANN model according to a motion pattern of a user to be specialized for the user. The prediction error 250 may be used to tune the ANN model or parameters of the ANN model used by the prediction module 230 to predict a pose of a user.

The prediction module 230 may predict a pose robustly against an estimation error by adjusting a weight for the ANN model based on the estimation confidence of the pose estimated in the estimation module 210. For example, when the estimation confidence is high, the prediction module 230 may tune the ANN model according to a user's behavior pattern by feeding back a prediction error compared to the pose estimated based on the SLAM scheme.

Figure 3:
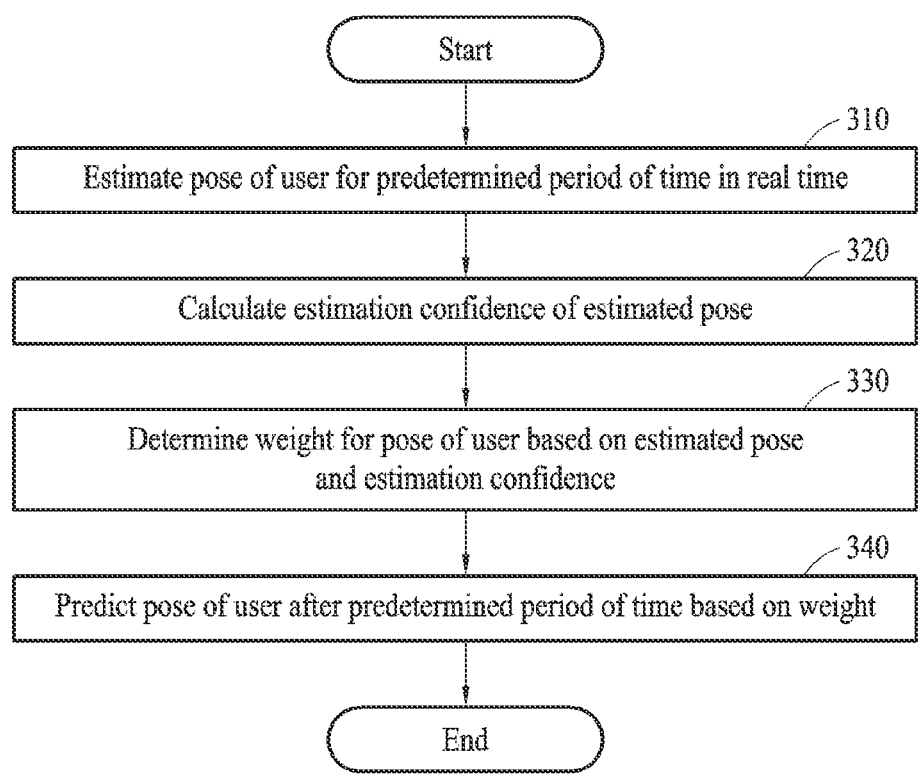
FIG. 3 illustrates an example of a pose prediction method.

FIG. 3 illustrates an example of a pose prediction method. FIG. 3 illustrates a process by which a pose prediction apparatus predicts a pose of a user after a predetermined period of time through operations 310 to 340.

In operation 310, the pose prediction apparatus may estimate a pose of a user for a predetermined period of time in real time. For example, the pose prediction apparatus may estimate a pose of a user for a predetermined period of time corresponding to a sliding time window using a SLAM scheme in real time. The predetermined period of time may correspond to, for example, a prediction time of the above-described sliding time window. The pose of the user may be understood to include, for example, a location and an orientation of a user. For example, the location may be represented by x, y, and z coordinates, and the orientation may be represented by pitch yaw and roll angles.

For example, in operation 310, the pose prediction apparatus may estimate a pose of a user for each time unit during 100 milliseconds (ms). When a time unit is 20 ms, the pose prediction apparatus may estimate a pose $P_1$ of a user for 20 ms, a pose $P_2$ of the user for 40 ms, a pose $P_3$ of the user for 60 ms, a pose $P_4$ of the user for 80 ms, and a pose $P_5$ of the user for 100 ms.

In operation 320, the pose prediction apparatus may calculate an estimation confidence (for example, an uncertainty or a confidence probability) of the pose estimated in operation 310. In an example, the pose prediction apparatus may calculate the uncertainty of the pose estimated in operation 310, based on an estimation covariance according to a SLAM scheme with a Kalman filter. In another example, the pose prediction apparatus may calculate the uncertainty of the pose estimated in operation 310, based on a residual value between the pose estimated in operation 310 and a value obtained by approximating the pose estimated in operation 310 using a curve fitting function.

In operation 330, the pose prediction apparatus may determine a weight for the pose of the user based on the estimated pose and the estimation confidence. In an example, when the estimation confidence calculated in operation 320 is greater than a predetermined threshold, the pose prediction apparatus may set the weight to be greater than a reference value. In another example, when the estimation confidence is less than or equal to the threshold, the pose prediction apparatus may adjust the weight based on a pose estimated for a time adjacent to the predetermined period of time for which the pose is estimated in operation 310. In operation 330, the pose prediction apparatus may refine the estimated pose by adjusting the weight.

Non-limiting examples in which the pose prediction apparatus calculates an uncertainty, determines a weight for a pose of a user, and refines the pose will be further described below with reference to FIGS. 5 to 7.

In operation 340, the pose prediction apparatus may predict a pose of the user after the predetermined period of time, based on the weight determined in operation 330.

Depending on examples, the pose prediction apparatus may calculate a prediction error between the pose estimated in operation 310 and the pose predicted in operation 340 based on the estimation confidence calculated in operation 320.

The pose prediction apparatus may calculate a prediction error based on a comparison result between the estimation confidence calculated in operation 320 and a predetermined threshold. In an example, when the estimation confidence is greater than the threshold, the pose prediction apparatus may calculate a prediction error. When an uncertainty of pose estimation by the SLAM scheme obtained after reaching an actual prediction time is less than a predetermined threshold (for example, $U_{required}$), the pose prediction apparatus may determine that an estimate is reliable, which will be further described below. In this example, the pose prediction apparatus may calculate a prediction error by comparing the pose estimated in operation 310 and the pose predicted in operation 340. The pose prediction apparatus may provide the prediction error as feedback to enable tuning of an ANN model according to a motion pattern of a user.

In an example, the pose prediction apparatus may tune a parameter of the ANN model by numerically calculating a gradient of the prediction error. In another example, the pose prediction apparatus may tune a parameter of the ANN model using a least square scheme by grouping poses with relatively high estimation confidences as a reference set. Examples in which the pose prediction apparatus tunes an ANN model will be further described below with reference to FIGS. 8 and 9.

In another example, when the estimation confidence is less than or equal to the threshold, the pose prediction apparatus may adjust the prediction error based on a comparison result between the estimated pose and a pose that is estimated for a time adjacent to the predetermined period of time for which the pose is estimated. For example, when the uncertainty of the pose estimation is greater than a predetermined threshold (for example, $U_{max}$), the pose prediction apparatus may determine that the estimated pose is unreliable, thereby removing the estimated pose from the sliding time window, or adjusting the weight by comparing the estimated pose and another adjacent pose.

Through the above-described process, the pose prediction apparatus may predict the pose of the user after the predetermined period of time, based on the refined pose, the estimation confidence, and the prediction error that is fed back. A non-limiting example of a configuration and an operation of the pose prediction apparatus will be further described below with reference to FIG. 4.

Figure 4:
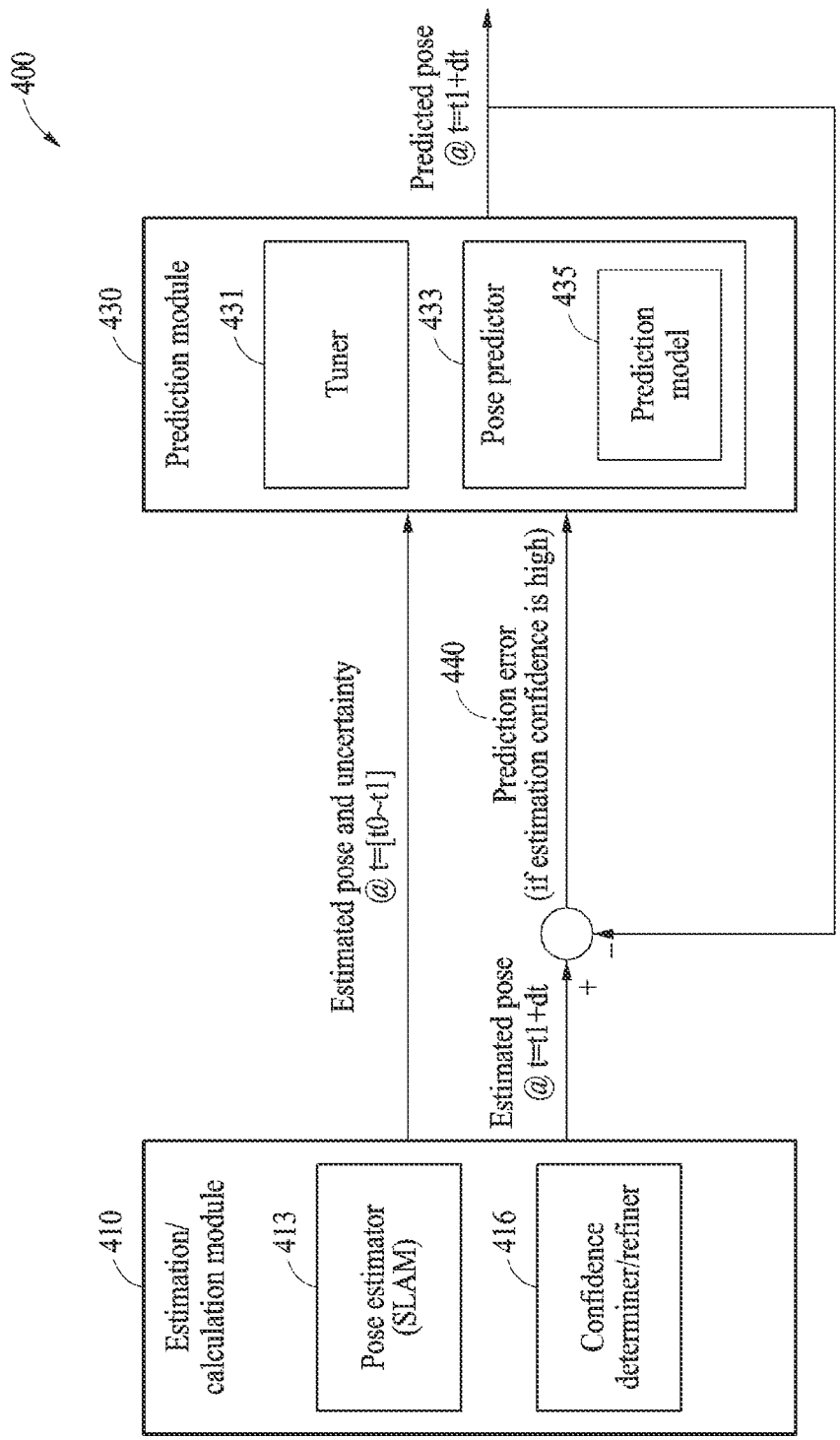
FIG. 4 illustrates an example of a configuration and an operation of a pose prediction apparatus.

FIG. 4 illustrates an example of a configuration and an operation of a pose prediction apparatus. FIG. 4 illustrates a configuration of a pose prediction apparatus 400.

The pose prediction apparatus 400 may predict a pose of a user after a predetermined prediction time dt, that is, a time ($t_1$+dt), based on "N" last poses estimated for a sliding time window from $t_0$ to $t_1$ and an uncertainty of each of the estimated poses.

The pose prediction apparatus 400 may include an estimation/calculation module 410 and a prediction module 430. In a non-limiting example, the pose prediction apparatus 400 may include the prediction module 430 and may not include the estimation/calculation module 410. In this example, a separate or external device may include the estimation/calculation module 410 that calculates an estimated pose and an estimation confidence of the estimated pose and the estimated pose and the estimation confidence may be provided to the pose prediction apparatus 400 by the separate or external device, such that the pose prediction apparatus 400 obtains the estimated pose and the estimation confidence from the external device. Although an operation in an example in which the pose prediction apparatus 400 includes both the estimation/calculation module 410 and the prediction module 430 will be mainly described below for convenience of description, other non-limiting examples may exist in which the pose prediction apparatus 400 includes the prediction module 430 and does not include the estimation/calculation module 410.

The estimation/calculation module 410 may estimate a pose of a user using a SLAM scheme, may calculate an estimation confidence (for example, an uncertainty) of the estimated pose, and may provide the estimated pose and the estimation confidence to the prediction module 430. The estimation/calculation module 410 may include a pose estimator 413 and a confidence determiner/refiner 416.

The pose estimator 413 may estimate a pose of a user in real time using the SLAM scheme. The confidence determiner/refiner 416 may determine a confidence of a pose estimated within the sliding time window from $t_0$ to $t_1$ by the pose estimator 413, and may refine the estimated pose based on a weight determined for each pose. For example, the weight may be set to be inversely proportional to the uncertainty. In an example, when the confidence of the estimated pose is greater than a predetermined threshold and when an uncertainty is low, the confidence determiner/refiner 416 may set a weight for a corresponding pose to be high. When the uncertainty is greater than the predetermined threshold, the confidence determiner/refiner 416 may remove the corresponding pose from the sliding time window or may adjust a weight value for the corresponding pose based on an adjacent estimated pose, because the corresponding pose is unreliable. The confidence determiner/refiner 416 may refine the estimated pose by the adjusted weight value.

When the estimated pose and the estimation confidence are input, the prediction module 430 may output a predicted pose after the prediction time dt. The predicted pose may be, for example, a pose corresponding to a head motion of a user.

The prediction module 430 may adjust a weight corresponding to the estimated pose based on the estimation confidence. For example, when the estimation confidence is greater than a predetermined threshold, the prediction module 430 may tune an ANN model (for example, the prediction model 435) based on a behavior pattern of a user by feeding back a prediction error 440. The tuning of the ANN model may be construed as applying the prediction model 435 to a corresponding user, or personalizing the prediction model 435.

The prediction module 430 may include a tuner 431, and a pose predictor 433. The pose predictor 433 may include the prediction model 435. As described above, the prediction model 435 may be configured as, for example, a regression neural network to which sequential inputs are applied over time, or a regression model.

The tuner 431 may tune the prediction model 435, for example, parameters of the prediction model 435, based on the prediction error 440. The tuner 431 may tune adjustable parameters by numerical calculating a gradient of the prediction error 440. The parameters may include, for example, a prediction time, and a regression parameter, but are not limited thereto.

The tuner 431 may operate when a confidence of an estimated pose is greater than a predetermined threshold. The tuner 431 may calculate the prediction error 440 by comparing the pose predicted by the pose predictor 433 and the pose estimated by pose estimator 413 using the SLAM scheme. The tuner 431 may provide the prediction error 440 as feedback to the pose predictor 433 and may minimize the prediction error 440. The tuner 431 may utilize an estimated pose with a relatively high confidence through a feedback structure, to minimize an estimation error. In an example, by feeding back an estimated pose with a relatively high confidence, the pose predictor 433 may be trained based on a behavior pattern of a user, to perform pose prediction suitable for each user. The tuner 431 may perform tuning based on the prediction error 440.

The pose predictor 433 may predict a pose after the prediction time dt based on the parameters tuned by the tuner 431, the estimation confidence, and the prediction error 440 that is fed back.

Figure 5:
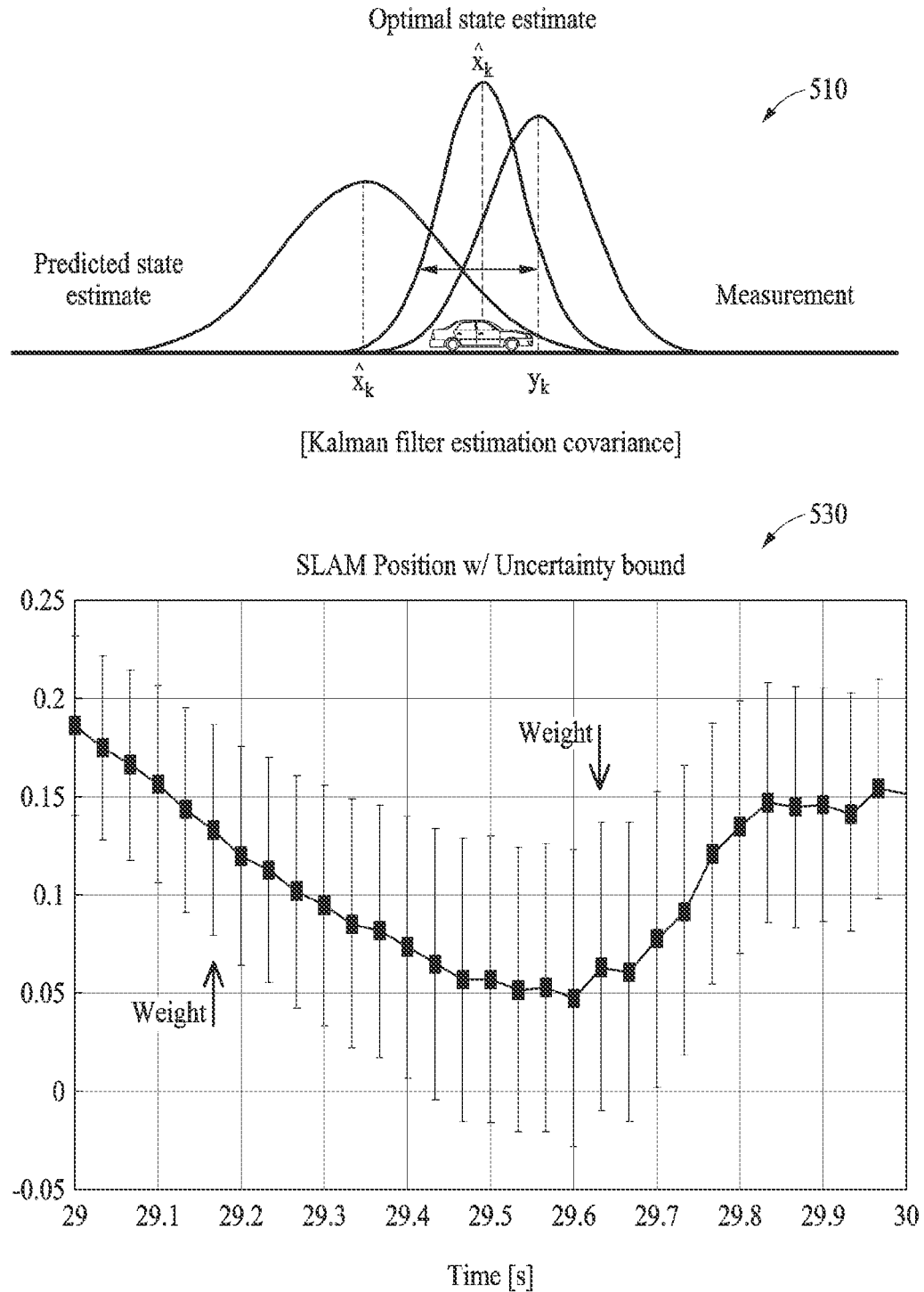
FIGS. 5 to 7 illustrate examples of calculating an estimation confidence and refining an estimated pose.

FIG. 5 illustrates an example of calculating an estimation confidence and refining an estimated pose. A graph 510 of FIG. 5 illustrates an example of using a Kalman filter estimation covariance to determine a pose estimation confidence.

To generate an optimal state estimate $\hat{x}_k$ that is unbiased with respect to a state of a system, a Kalman filter may combine information of two sources, for example, a predicted state estimate $x_k$ and noisy measurement values $y_k$. The term "optimal" used herein may be construed to refer to minimizing a variance of estimated states.

The graph 510 may show a process in which a measured output has an influence on a linear single state system identical to a state (for example, a location of a vehicle), and measurement noise. For an uncertain measurement, the Kalman filter may calculate a state estimate that is unbiased with a minimum variance, and an operating principle of the Kalman filter may be understood through a probability density function shown in the graph 510.

For example, when a SLAM scheme with the Kalman filter is utilized, a state variable including a pose to be estimated, an estimation covariance according to the state variable, and an uncertainty may be represented as shown in Equation 1 below, for example.

$$x_k = [p\,v\,a\,b_a\,b_g]^T$$

$$P_k = E[(x_k - \hat{x}_k)(x_k - \hat{x}_k)^T]$$

$$U_k = \text{sqrt}(\text{diagonal}(P_k)) \qquad \text{Equation 1:}$$

In Equation 1, $x_k$ denotes a state variable to be estimated in a time step k. Also, p, v, and a denote position, velocity and attitude states, respectively, and $b_a$, and $b_g$ denote inertial measurement unit (IMU) biases (3-dimension each). $P_k$ denotes an estimation covariance, and $U_k$ denotes an uncertainty in the time step k.

A pose prediction apparatus may determine a weight for a pose of a user according to an estimation covariance, and may refine an estimated pose by adjusting the weight.

For example, the pose prediction apparatus may calculate a weight by calculating a difference $\sigma_{diff}(t)$ between an estimation covariance $\sigma(t)$ of a time step t and a mean covariance $\sigma_{mean}$ in a sliding time window, as shown in Equation 2 below, for example.

$$\sigma_{diff}(t)=\sigma(t)-\sigma_{mean} \quad \text{Equation 2:}$$

For example, if the difference $\sigma_{diff}(t)$ is greater than a predetermined threshold, the pose prediction apparatus may set the weight to "0". If the weight is set to "0", the pose prediction apparatus may generate a smooth pose by interpolating a predicted pose into an adjacent pose.

As shown in a graph 530, the pose prediction apparatus may set the weight to decrease as the difference $\sigma_{diff}(t)$ increases, and may set the weight to increase as the difference $\sigma_{diff}(t)$ decreases.

Figure 6:
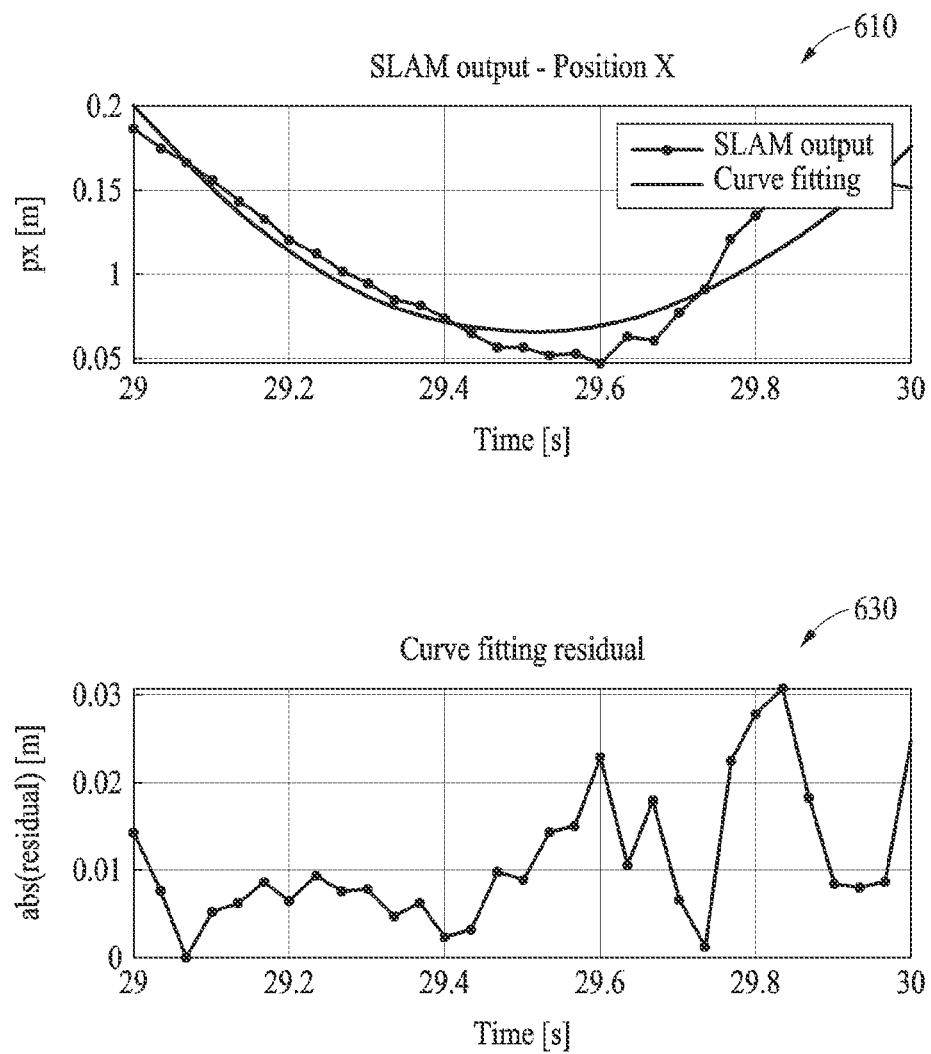

FIG. 6 illustrates another example of calculating an estimation confidence and refining an estimated pose. In FIG. 6, a graph 610 shows a pose estimated by a SLAM scheme, indicated by "SLAM output", and a value obtained by approximating an estimated pose by a curve fitting function, indicated by "Curve fitting", and a graph 620 shows a residual value between a pose estimated by the SLAM scheme and a value obtained by approximating the estimated pose by the curve fitting function.

A pose prediction apparatus may approximate an estimated pose using a predefined curve fitting function, may calculate a residual value, and may refine a predicted pose according to a weight.

For example, the pose prediction apparatus may calculate an uncertainty of the estimated pose, based on the residual value between the pose estimated by the SLAM scheme and a value obtained by approximating the estimated pose using the curve fitting function. A residual value using curve fitting may be calculated as shown in Equation 3 below, for example.

$$res_k=\hat{x}_k-g_k, \ U_k=fn(res_k) \quad \text{Equation 3:}$$

In Equation 3, $\hat{x}_k$ denotes a value of a pose estimated by the SLAM scheme in a time step k, and $g_k$ denotes a curve fitting function that approximates a head motion in the time step k. Also, $res_k$ denotes a residual value calculated by an estimate in a time step and a curve fitting function.

The pose prediction apparatus may calculate an uncertainty in proportion to the residual value.

Figure 7:
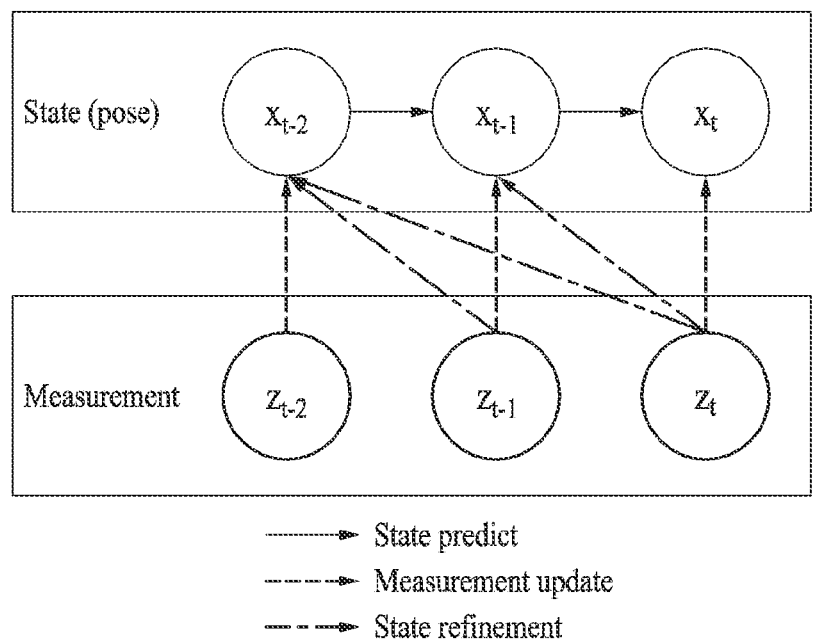

FIG. 7 illustrates another example of calculating an estimation confidence and refining an estimated pose. FIG. 7 illustrates state variables corresponding to an estimated pose and measurement values of a sensor for a pose.

A pose prediction apparatus may refine the estimated pose by updating state variables corresponding to a pose at a previous point in time in addition to a pose at a current point in time, using measurement values of the sensor.

The pose prediction apparatus may use a Kalman filter backpropagation or a pose graph optimization scheme to refine the estimated pose.

When a new measurement value $Z_t$ is received from at least one sensor, the pose prediction apparatus may optimize and refine previously estimated poses (for example, $X_{t-2}$, and $X_{t-1}$). The pose prediction apparatus may perform pose prediction using a refined pose estimate.

The pose prediction apparatus may refine the estimated pose by updating poses at previous points in time together through, for example, Kalman filter backpropagation or pose graph optimization. The pose prediction apparatus may use a pose estimate with a higher confidence when only a latest pose estimate is used when obtaining a pose estimate within a sliding time window for pose prediction by updating poses at previous points in time together and refining the estimated pose.

The pose prediction apparatus may adjust a weight based on a determination of a confidence for a refined pose. For example, a Kalman filter covariance as described above may be used to determine a confidence of a refined pose.

Depending on examples, the pose prediction apparatus may also perform pose prediction using an estimate of a pose refined through Kalman filter backpropagation or pose graph optimization in a prediction model without a change.

Figure 8:
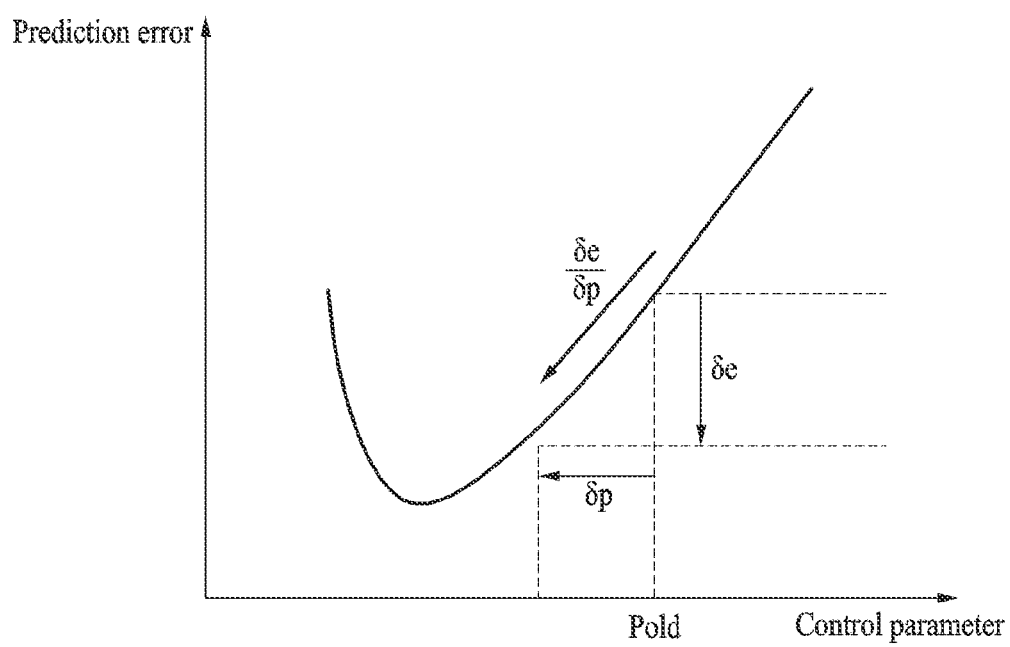
FIGS. 8 and 9 illustrate examples of tuning an artificial neural network (ANN) model.

FIG. 8 illustrates an example of tuning an ANN model. A graph of FIG. 8 shows a relationship between a prediction error and a control parameter of an ANN model. The ANN model may be, for example, the above-described prediction model 435 of FIG. 4.

For example, when a confidence of a pose estimated by a SLAM scheme is high, a pose prediction apparatus may tune a prediction model according to a behavior pattern of a user by feeding back a prediction error. The pose prediction apparatus may tune a parameter by numerically calculating a gradient of a prediction error for an adjustable control parameter. The adjustable control parameter may include, for example, a prediction time or a regression parameter, but is not limited thereto.

For example, the pose prediction apparatus may tune a parameter as shown in Equation 4 below.

$$p_{new} = p_{old} - \alpha \frac{\partial e}{\partial p} \quad \text{Equation 4}$$

In Equation 4, $p_{old}$ denotes a control parameter that is not tuned, and $p_{new}$ denotes a control parameter that is tuned. e denotes a prediction error. $\alpha$ denotes a parameter tuning coefficient and may have a value between "0" and "1".

$$\frac{\partial e}{\partial p}$$

denotes a prediction error gradient for a control parameter.

The pose prediction apparatus may internally calculate the prediction model changed by $\partial p$ for numerical calculation of the gradient. When an uncertainty of a pose estimated by a SLAM scheme is less than a predetermined threshold, the pose prediction apparatus may calculate the prediction error gradient and tune the prediction model, because an estimate is reliable.

Figure 9:
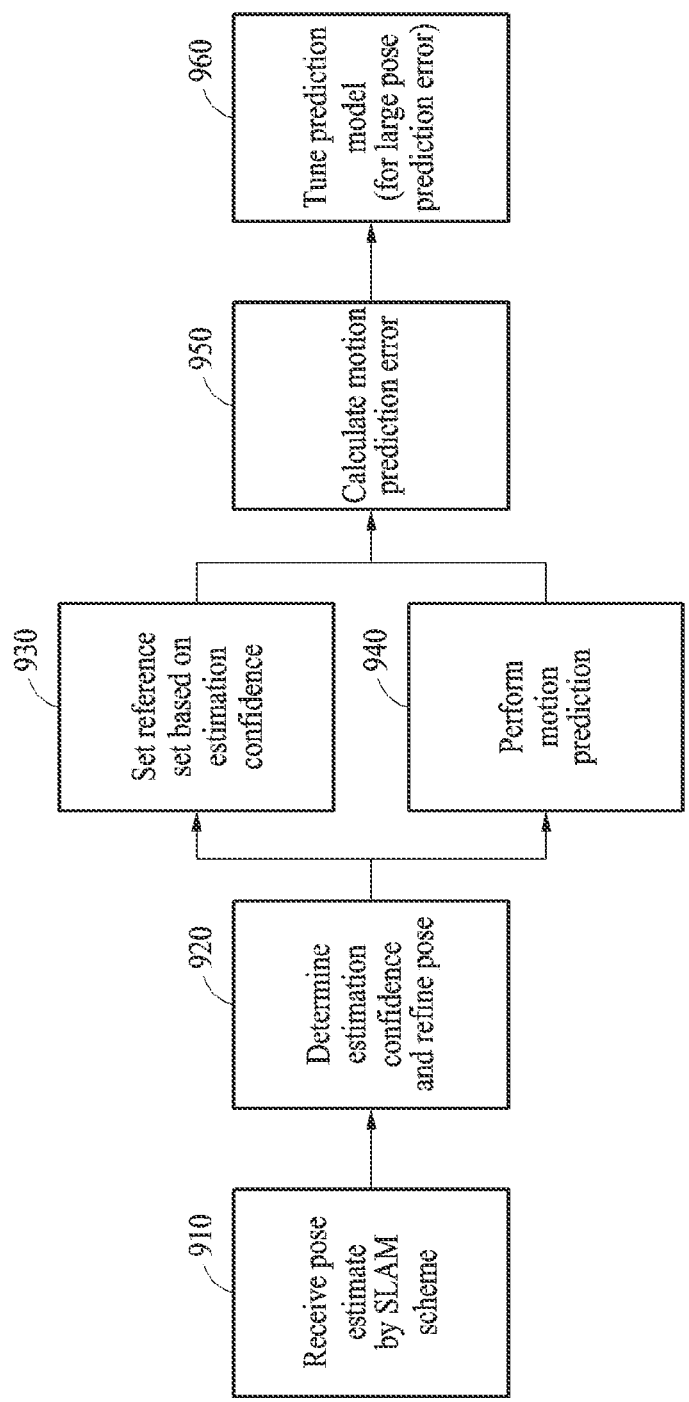

FIG. 9 illustrates another example of tuning an ANN model. FIG. 9 illustrates a process by which a pose prediction apparatus tunes an ANN model through operations 910 to operation 960.

In operation 910, the pose prediction apparatus may receive a pose estimate by a SLAM scheme.

In operation 920, the pose prediction apparatus may determine an estimation confidence of the pose estimate received in operation 910, and may refine an estimated pose.

In operation 930, the pose prediction apparatus may set a reference set based on the estimation confidence determined in operation 920.

In an example, when an average pose prediction error in the reference set is greater than a predetermined threshold, the pose prediction apparatus may tune a parameter. For example, the pose prediction apparatus may group poses with high estimation confidences as a reference set, and may tune parameters of the ANN model using a least square scheme. The least square scheme may be one of schemes of finding a parameter through optimization, and may correspond to a scheme of finding solutions such that a sum of squares of errors between approximate solutions and actual solutions is minimized. In this example, the parameter may be a coefficient of an equation representing a predetermined system, or a parameter of a filter or a simple relational expression. In an example, a parameter may correspond to a control parameter of the above-described ANN model, for example, a prediction model.

In operation 940, the pose prediction apparatus may perform motion prediction by the prediction model.

In operation 950, the pose prediction apparatus may calculate a motion prediction error.

In operation 960, the pose prediction apparatus may tune the prediction model based on the motion prediction error calculated in operation 950. If a pose prediction error is large, the pose prediction apparatus may tune the prediction model.

Figure 10:
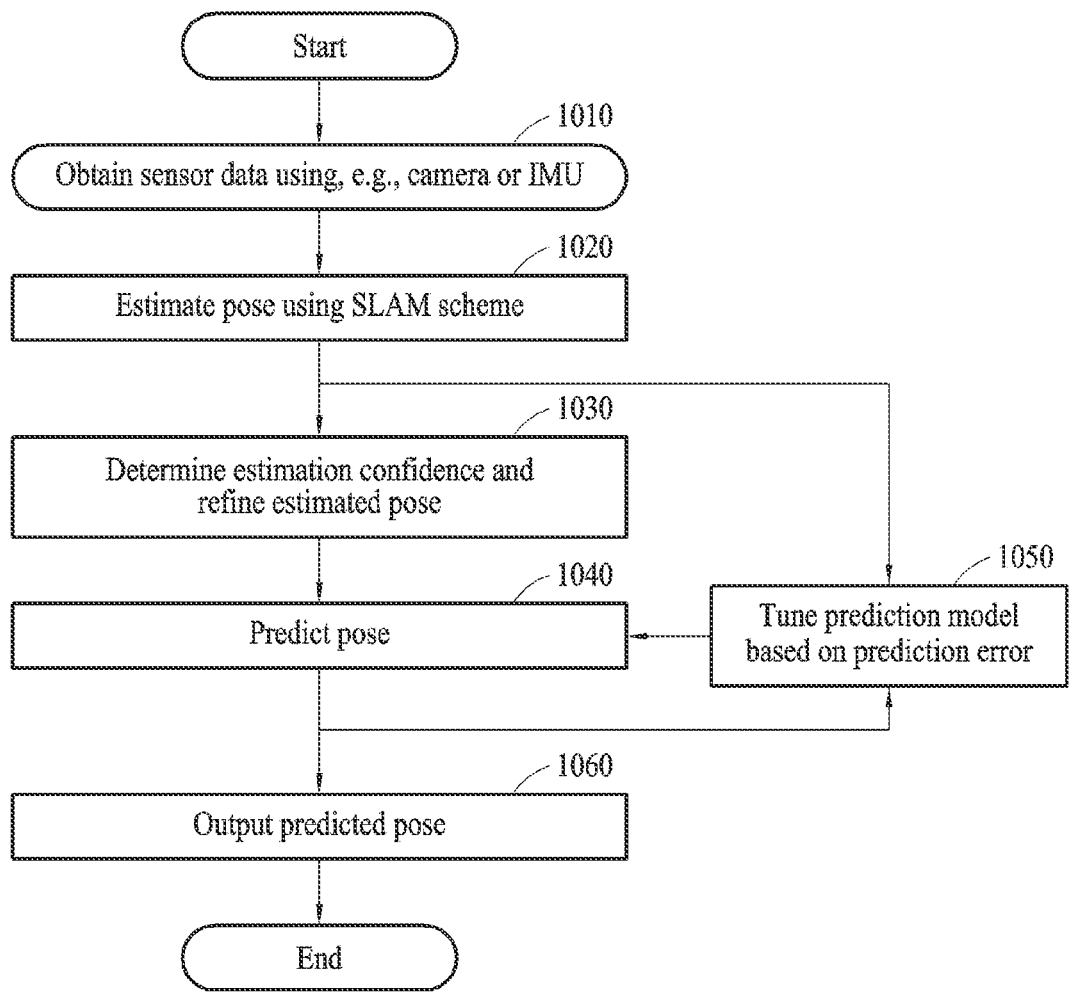
FIG. 10 illustrates an example of a pose prediction method.

FIG. 10 illustrates another example of a pose prediction method. FIG. 10 illustrates a process by which a pose prediction apparatus predicts a pose of a user through operations 1010 to operation 1060.

In operation 1010, the pose prediction apparatus may obtain sensor data by sensing a pose of a user based on a motion of the user. The sensor data may be obtained by, for example, a camera sensor, an IMU sensor, or a gyro sensor, however, there is no limitation thereto.

In operation 1020, the pose prediction apparatus may estimate the pose of the user using a SLAM scheme based on the sensor data obtained in operation 1010.

In operation 1030, the pose prediction apparatus may determine an estimation confidence of the pose estimated in operation 1020, and may refine the estimated pose. The pose prediction apparatus may set a weight of each pose based on the estimation confidence (for example, an uncertainty) of the estimated pose. The pose prediction apparatus may refine the estimated pose through the set weight to be robust against the uncertainty. Subsequently, the pose prediction apparatus may perform pose prediction based on a difference between the refined pose and a predicted pose.

In operation 1040, the pose prediction apparatus may predict a pose using a prediction model.

In operation 1050, the pose prediction apparatus may tune the prediction model based on a prediction error between the pose estimated in operation 1020 and the pose predicted in operation 1040. The pose prediction apparatus may predict the pose again in operation 1040 using the prediction model tuned in operation 1050.

In operation 1060, the pose prediction apparatus may output the pose predicted in operation 1040.

Figure 11:
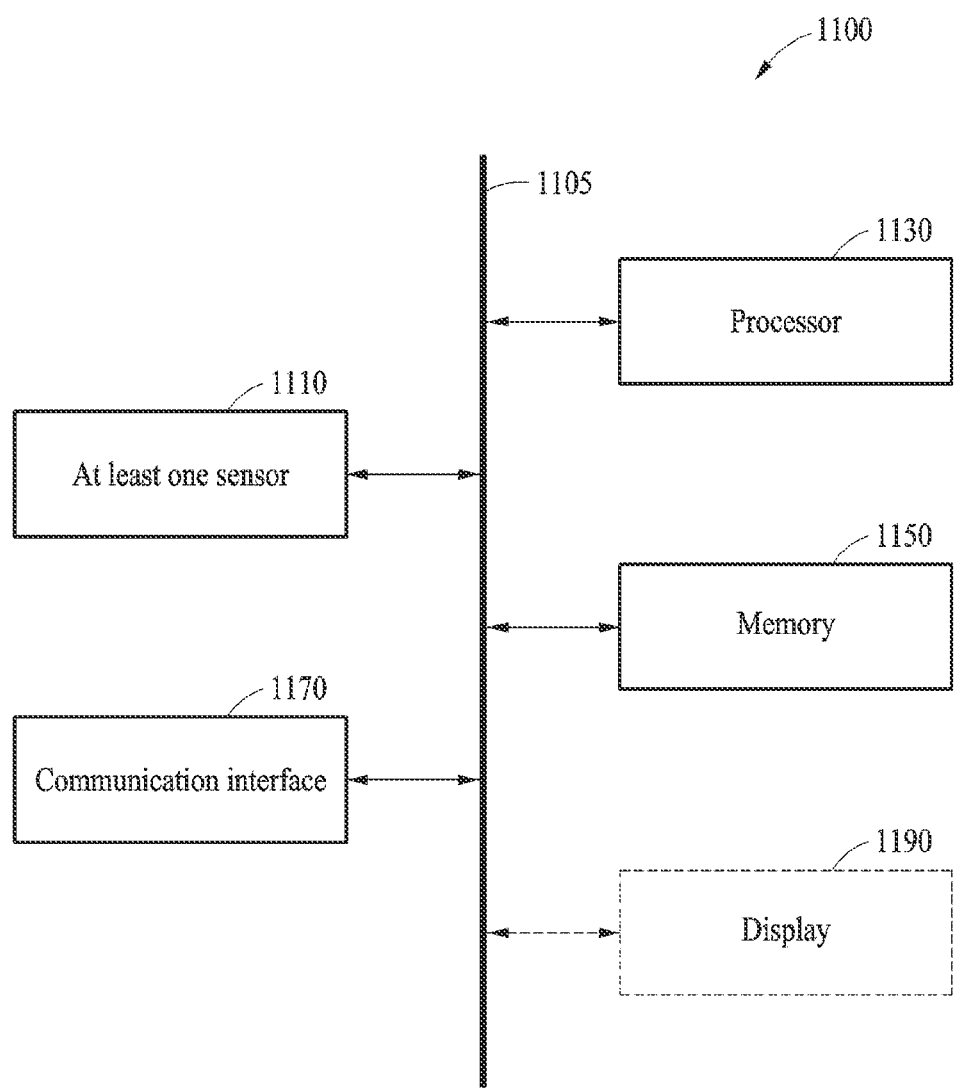
FIG. 11 illustrates an example of a pose prediction apparatus.

FIG. 11 illustrates an example of a pose prediction apparatus. Referring to FIG. 11, a pose prediction apparatus 1100 may include at least one sensor 1110, a processor 1130, a memory 1150, a communication interface 1170, and a display 1190. The at least one sensor 1110, the processor 1130, the memory 1150, the communication interface 1170, and the display 1190 may be connected to each other via a communication bus 1105.

The at least one sensor 1110 may sense a motion of a user for a predetermined period of time.

The processor 1130 may estimate a pose of the user based on the motion of the user sensed by the at least one sensor 1110 in real time. The processor 1130 may calculate an estimation confidence of the estimated pose. The processor 1130 may determine a weight for the pose of the user based on the estimated pose and the estimation confidence. The processor 1130 may predict a pose of the user after a predetermined period of time, based on the weight.

The memory 1150 may store the motion of the user sensed by the at least one sensor 1110. Also, the memory 1150 may store the pose of the user estimated in real time by the processor 1130 and/or the estimation confidence of the estimated pose calculated by the processor 1130. The memory 1150 may store the weight determined by the processor 1130 and/or the pose of the user after the predetermined period of time predicted by the processor 1130.

The communication interface 1170 may receive the motion of the user sensed by the at least one sensor 1110. The communication interface 1170 may transmit the pose of the user after the predetermined period of time predicted by the processor 1130 to the outside of the pose prediction apparatus 1100.

The pose prediction apparatus 1100 may selectively include the display 1190. For example, when the display 1190 is included in the pose prediction apparatus 1100, the pose prediction apparatus 1100 may match a virtual content object and a real object based on the pose of the user after the predetermined period of time predicted by the processor 1130, and may display a matching result on the display 1190.

The pose prediction apparatus 1100 may correspond to apparatuses in various fields, for example, an advanced driver-assistance system (ADAS), a head-up display (HUD), a three-dimensional (3D) digital information display (DID), a navigation device, a neuromorphic device, a 3D mobile device, a smartphone, a smart television (TV), a smart vehicle, an Internet of Things (IoT) device, a medical device, and a measuring device. The 3D mobile device may be understood to include, for example, a display device configured to display AR, virtual reality (VR), and/or mixed reality (MR), a head-mounted display (HMD), a face-mounted display (FMD), and AR glasses.

For example, the pose prediction apparatus 1100 is AR glasses, the processor 1130 may match a virtual content object and a real object based on a pose of a user predicted through the above-described process. In this example, the display 1190 may visualize the virtual content object and the real object matched by the processor 1130. The display 1190 may include, for example, a flexible display, but is not limited thereto.

Also, the processor 1130 may perform at least one method described with reference to FIGS. 1 through 10, or a scheme corresponding to the at least one method. The processor 1130 may be a hardware-implemented pose estimation apparatus having a circuit that is physically structured to execute desired operations. For example, the desired operations may include code or instructions included in a program. The hardware-implemented pose estimation apparatus may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The processor 1130 may execute a program and may control the pose prediction apparatus 1100. Code of the program executed by the processor 1130 may be stored in the memory 1150.

As described above, the memory 1150 may store a variety of information generated in a processing process of the above-described processor 1130. Also, the memory 1150 may store a variety of data and programs. The memory 1150 may include, for example, a volatile memory or a non-volatile memory. The memory 1150 may include a high-capacity storage medium such as a hard disk to store a variety of data.

The pose prediction apparatuses, estimation modules, prediction modules, estimation/calculation modules, pose estimators, confidence determiner/refiners, tuners, pose predictors, sensors, processors, memories, communication interfaces, displays, pose prediction apparatus 200, estimation module 210, prediction module 230, pose prediction apparatus 400, estimation/calculation module 410, pose estimator 413, confidence determiner/refiner 416, prediction module 430, tuner 431, pose predictor 433, prediction model 435, pose prediction apparatus 1100, at least one sensor 1110, processor 1130, memory 1150, communication interface 1170, display 1190, and other apparatuses, units, modules, devices, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented pose prediction method comprising:
    estimating a pose of a user for a predetermined period of time in real time;
    calculating an estimation confidence of the estimated pose;
    determining a weight for the pose of the user based on the estimated pose and the estimation confidence; and
    predicting a pose of the user after the predetermined period of time, based on the weight.

2. The method of claim 1, further comprising:
    calculating a prediction error between the estimated pose and the predicted pose, based on the estimation confidence; and
    tuning an artificial neural network (ANN) model by feeding back the prediction error, the ANN model being configured to predict a pose of the user.

3. The method of claim 2, wherein the calculating of the prediction error comprises calculating the prediction error based on a comparison result between the estimation confidence and a predetermined threshold.

4. The method of claim 3, wherein the calculating of the prediction error based on the comparison result comprises:
    calculating the prediction error in response to the estimation confidence being greater than the threshold; and
    adjusting the prediction error based on a comparison result between the estimated pose and a pose that is estimated for a time adjacent to the predetermined period of time for which the pose is estimated, in response to the estimation confidence being less than or equal to the threshold.

5. The method of claim 2, wherein the tuning of the ANN model comprises tuning a parameter of the ANN model by numerically calculating a gradient of the prediction error.

6. The method of claim 2, wherein the tuning of the ANN model comprises tuning a parameter of the ANN model using a least square scheme by grouping poses with relatively high estimation confidences as a reference set.

7. The method of claim 1, wherein the calculating of the estimation confidence comprises calculating an uncertainty of the estimated pose, based on an estimation covariance according to a simultaneous localization and mapping (SLAM) scheme with a Kalman filter.

8. The method of claim 1, wherein the calculating of the estimation confidence comprises calculating an uncertainty of the estimated pose, based on a residual value between the estimated pose and a value obtained by approximating the estimated pose using a curve fitting function.

9. The method of claim 2, wherein the predicting of the pose comprises:
    refining the estimated pose by adjusting the weight; and
    predicting the pose of the user after the predetermined period of time based on the refined pose, the estimation confidence, and the prediction error that is fed back.

10. The method of claim 1, wherein the determining of the weight comprises:
    setting the weight to be greater than a reference value in response to the estimation confidence being greater than a predetermined threshold; and
    adjusting the weight based on a pose that is estimated for a time adjacent to the predetermined period of time for which the pose is estimated, in response to the estimation confidence being less than or equal to the threshold.

11. The method of claim 1, wherein the estimating of the pose comprises estimating the pose of the user for the predetermined period of time corresponding to a sliding time window using a SLAM scheme in real time.

12. A non-transitory computer-readable storage medium storing instructions that, when executed by a processor, configure the processor to perform the method of claim 1.

13. A pose prediction apparatus comprising:
    one or more sensors configured to sense a motion of a user for a predetermined period of time; and
    a processor configured to:
        estimate a pose of the user based on the motion of the user in real time;
        calculate an estimation confidence of the estimated pose;
        determine a weight for the pose of the user based on the estimated pose and the estimation confidence; and
        predict a pose of the user after the predetermined period of time, based on the weight.

14. The apparatus of claim 13, wherein the processor is configured to:
    calculate a prediction error between the estimated pose and the predicted pose, based on the estimation confidence; and
    tune an artificial neural network (ANN) model by feeding back the prediction error, the ANN model being configured to predict a pose of the user.

15. The apparatus of claim 14, wherein, for the calculating of the prediction error, the processor is configured to calculate the prediction error based on a comparison result between the estimation confidence and a predetermined threshold.

16. The apparatus of claim 15, wherein, for the calculating of the prediction error, the processor is configured to:
calculate the prediction error in response to the estimation confidence being greater than the threshold; and
adjust the prediction error based on a comparison result between the estimated pose and a pose that is estimated for a time adjacent to the predetermined period of time for which the pose is estimated, in response to the estimation confidence being less than or equal to the threshold.

17. The apparatus of claim 14, wherein, for the tuning of the ANN model, the processor is configured to tune a parameter of the ANN model by numerically calculating a gradient of the prediction error.

18. The apparatus of claim 14, wherein, for the tuning of the ANN model, the processor is configured to tune a parameter of the ANN model using a least square scheme by grouping poses with relatively high estimation confidences as a reference set.

19. The apparatus of claim 13, wherein, for the predicting of the pose, the processor is configured to:
refine the estimated pose by adjusting the weight; and
predict the pose of the user after the predetermined period of time based on the refined pose, the estimation confidence, and the prediction error that is fed back.

20. The apparatus of claim 13, wherein the apparatus is an augmented reality (AR) glasses apparatus comprising a display configured to visualize a virtual content object and a real object that are matched based on the predicted pose of the user.

21. An augmented reality (AR) glasses apparatus comprising:
one or more sensors configured to sense a motion of a user for a predetermined period of time;
a processor configured to:
estimate a pose of the user based on the motion of the user in real time;
calculate an estimation confidence of the estimated pose;
determine a weight for the pose of the user based on the estimated pose and the estimation confidence;
predict a pose of the user after the predetermined period of time, based on the weight; and
match a virtual content object and a real object based on the predicted pose of the user; and
a display configured to visualize the virtual content object and the real object that are matched.

22. A processor-implemented pose prediction method comprising:
determining a weight for a pose of a user based on an estimated pose of the user for a predetermined period of time and on an estimation confidence of the estimated pose;
predicting, using a neural network model, a pose of the user after the predetermined period of time, based on the weight;
calculating a prediction error of the predicted pose; and
tuning the neural network model based on the prediction error.

23. The method of claim 22, wherein, in response to the estimation confidence being greater than a threshold, the calculating of the prediction error comprises calculating the prediction error based on a comparison result between the estimated pose and the predicted pose.

24. The method of claim 22, wherein, in response to the estimation confidence being less than or equal to a threshold, the calculating of the prediction error comprises calculating the prediction error based on a comparison result between the estimated pose and a pose that is estimated for a time adjacent to the predetermined period of time for which the pose is estimated.

25. The method of claim 22, wherein
the weight is a weight of neural network model, and
the predicting comprises applying the weight to the estimated pose in response to inputting the estimated pose to the neural network model.

* * * * *